Oct. 7, 1969  E. M. OSTROWSKY ET AL  3,471,054
WORK MEMBER POSITIONING STRUCTURE AND COMBINATION
THEREOF WITH A CONTAINER
Filed June 19, 1968  3 Sheets-Sheet 1

INVENTORS
EFREM M. OSTROWSKY
JOSEPH P. TUNZI
BY
ATTORNEYS

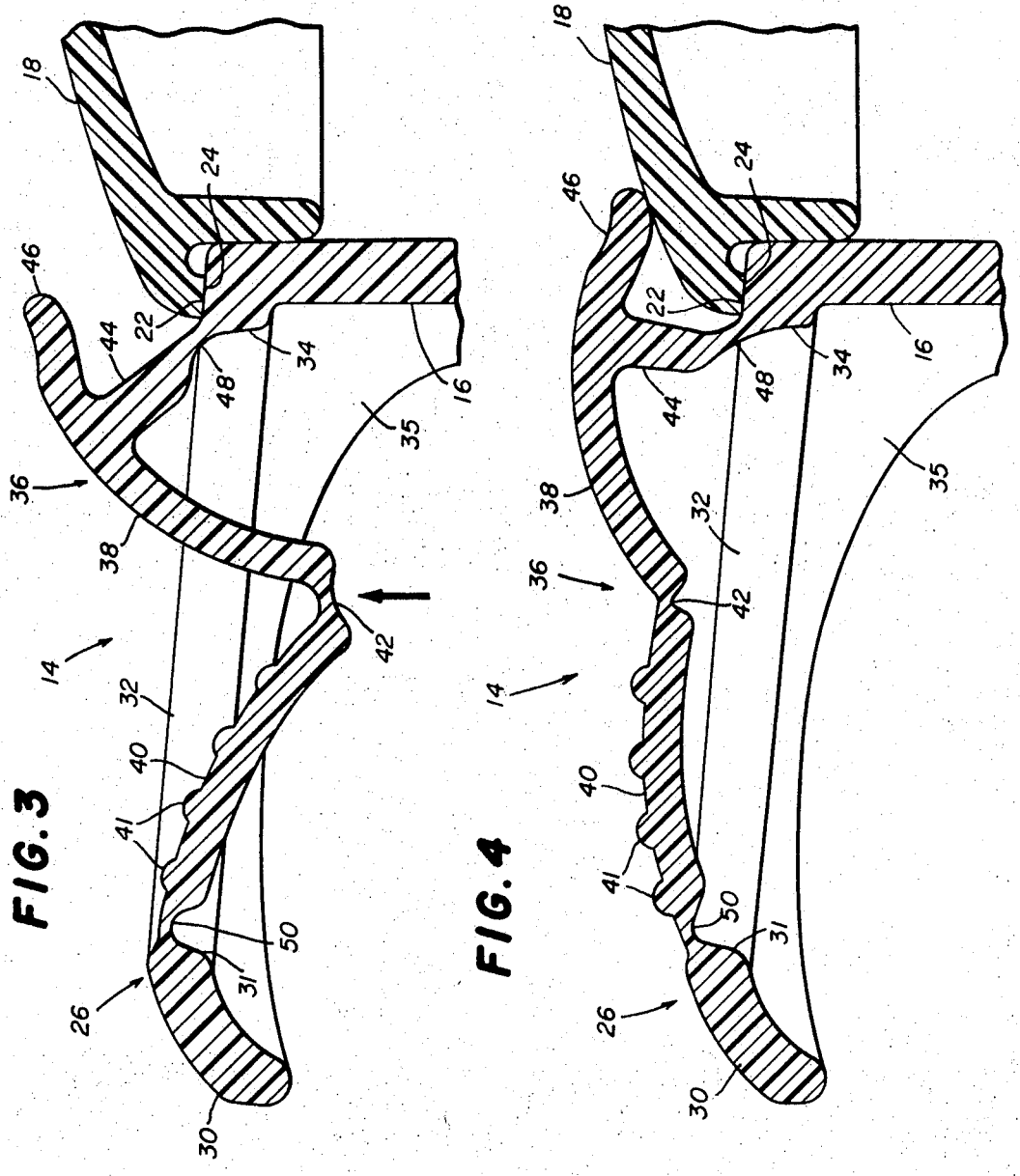

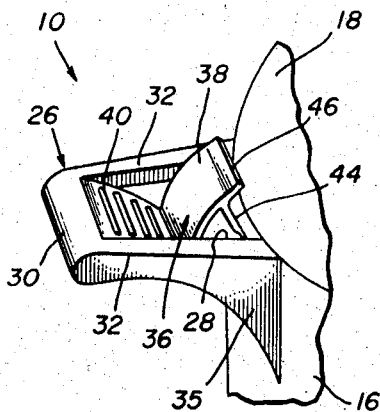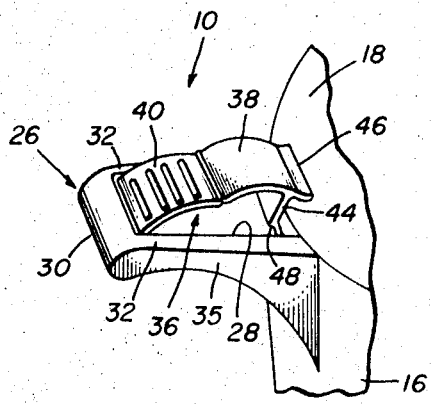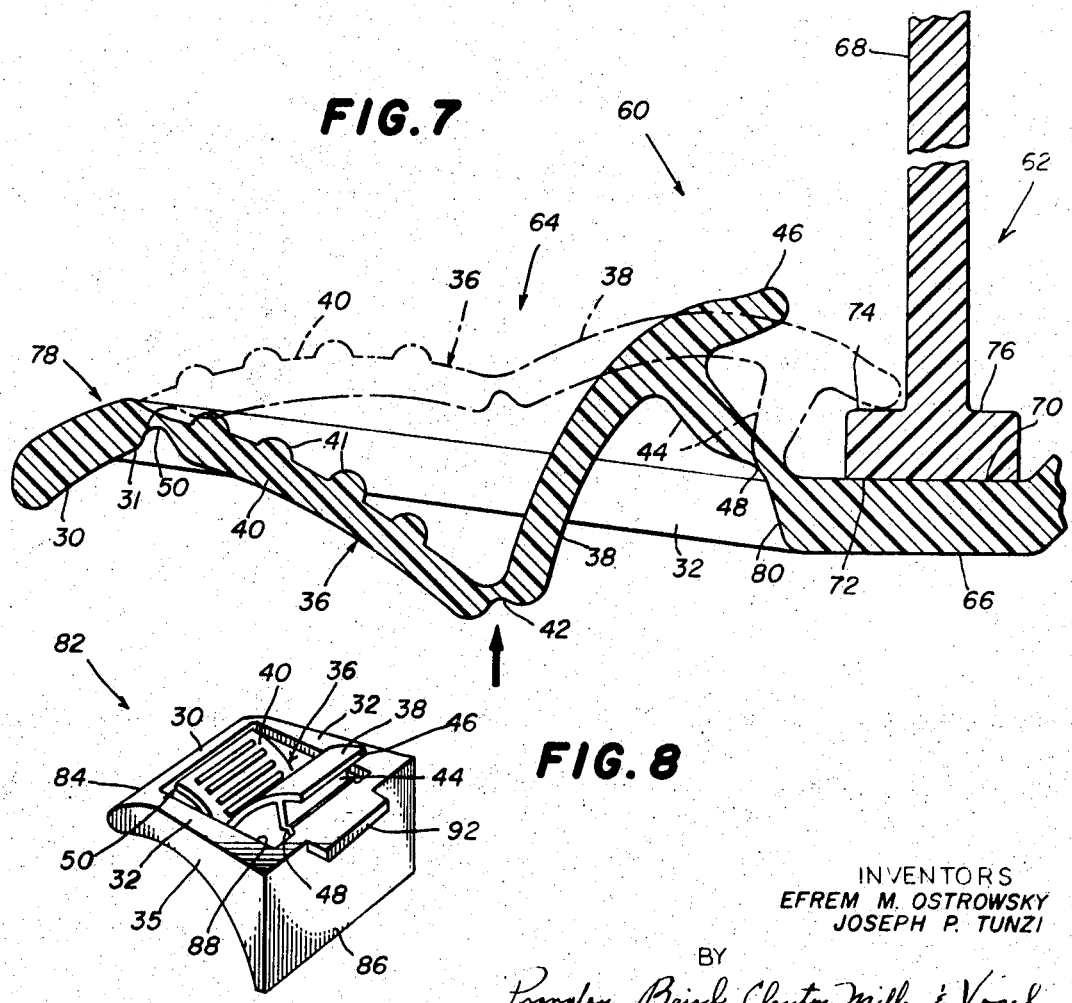

United States Patent Office 3,471,054
Patented Oct. 7, 1969

3,471,054
WORK MEMBER POSITIONING STRUCTURE AND COMBINATION THEREOF WITH A CONTAINER
Efrem M. Ostrowsky, Highland Park, and Joseph P. Tunzi, Chicago, Ill., assignors to Nibot Corporation, Chicago, Ill., a corporation of Illinois
Filed June 19, 1968, Ser. No. 738,224
Int. Cl. B65d 45/18; A47j 27/08, 36/10
U.S. Cl. 220—55.7   6 Claims

ABSTRACT OF THE DISCLOSURE

There is disclosed a clamping member positioning structure in the form of a clasp cooperating with the cover and body of a container, the clamping member positioning structure being preferably formed integrally in one-piece of a suitable plastic such as polypropylene plastic and having two stable positions; the structure comprising first and second spaced-apart opposed support elements carrying therebetween first and second arms hingedly mounted thereon and to each other and connected by a resilient hinge structure, and a clamping member hingedly mounted on one of the arms and movable therewith as the hinge structure moves between the two stable positions thereof.

---

This invention relates to a clamping member positioning structure and may advantageously be incorporated in a clasp used to retain a cover or the like on the body of a container.

It is an important object of the present invention to provide a clamping member positioning structure having two stable positions comprising first and second spaced-apart opposed support elements substantially rigidly mounted with respect to each other, first and second arms respectively hingedly mounted adjacent to one end thereof upon the first and second support elements, resilient hinge structure interconnecting the other ends of the arms, a clamping member mounted on one of the arms and movable therewith between first and second positions with respect to the support element, the arms and the hinge structure being constructed and arranged to permit the arms and the hinge structure to be moved between a first stable position disposed on one side of a plane defined by the support elements and a second stable position disposed on the other side of the plane, the arms in the first stable position holding the clamping member in the first position thereof and the arms in the second stable position holding the clamping member in the second position thereof.

In connection with the foregoing object, it is another object of the invention to provide a structure of the type set forth wherein the support elements and the arms and the hinge structure are formed integrally of a synthetic organic plastic resin, the preferred resin being a polypropylene plastic.

Another object of the invention is to provide a structure of the type set forth in the form of a clasp wherein the clamping member serves to hold the members of the clasp together.

A further object of the invention is to provide in combination with a container including separable body and cover members a clasp of the type set forth above for releasably securing the body and cover members one to the other.

Further features of the invention pertain to the particular arrangement of the parts whereby the above-outlined and additional operating features thereof are attained.

The invention, both as to its organization and method of operation, together with further objects and advantages thereof, will best be understood by reference to the following specification taken in connection with the accompanying drawings, in which:

FIG. 3 is an enlarged fragmentary cross sectional view thereof, particularly illustrating one of the clasps as it appears when open, taken on line 3—3 of FIG. 2;

FIG. 4 is a view like FIG. 3 but showing the clasp closed;

FIGS. 5 and 6 are fragmentary perspective views thereof, particularly showing one of the clasps, the clasp being open and closed in the respective views;

FIG. 7 is a fragmentary cross sectional view similar to FIG. 3 of a similar clasp integrally mounted on another container, representing another embodiment of the invention; and FIG. 8 is a perspective view of an individually constructed clasp similar to the clasps shown in the preceding views, the clasp being open, representing an additional embodiment of the invention.

Figure 1:
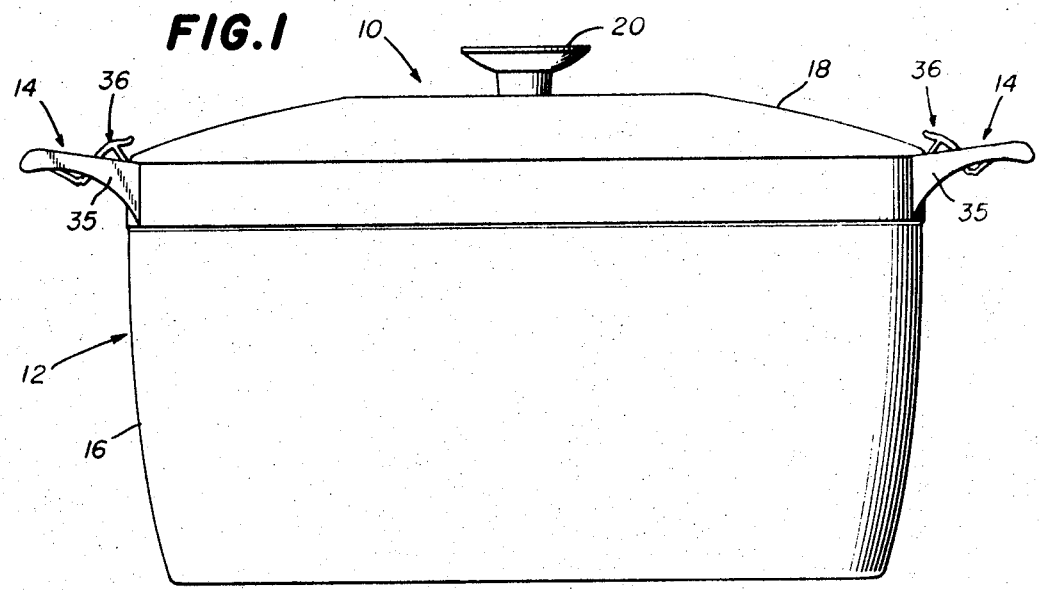
FIGURE 1 is a side elevational view of container provided with a pair of integral clasps according to the invention.
Figure 2:
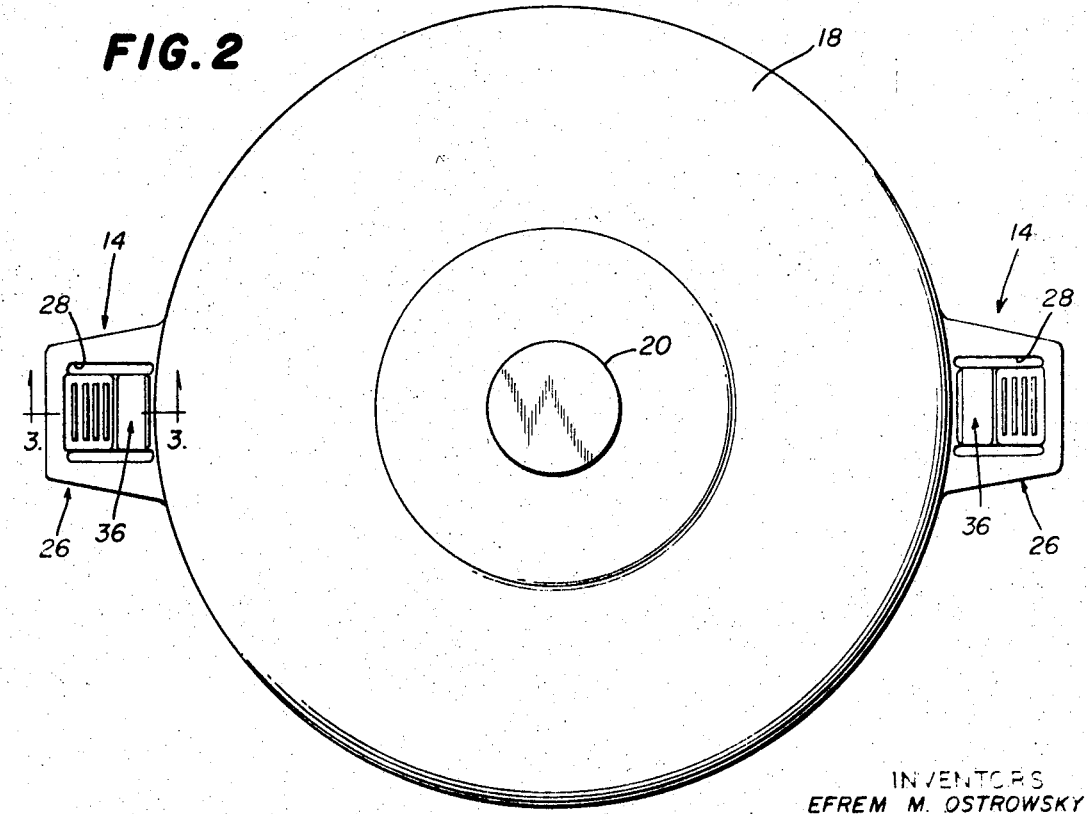
FIG. 2 is a top plan view thereof.

Referring to the drawings, particularly FIGS. 1–6, there is illustrated a clamping member positioning structure according to the present invention in the form of a unitary container and clasp assembly 10 including a food container or canister 12 and a pair of identical clasps 14 also serving as handles. The container includes a circular bowl or body 16 and a circular cover or lid 18 having a knob 20 thereon. The clasps 14 are integrally mounted on the bowl adjacent to a circular rim 22 thereof in diametrically opposed relation. The cover has a circular rim 24 which abuts on the bowl rim when the cover is in place. The clasps serve for clamping the rims together when the clasps are closed, thereby securing the cover on the bowl.

Each clasp 14 includes a generally rectangular frame 26 having a substantially rectangular opening 28 therein. The frame includes a support bar or element 30 having an integral enlargement 31 along its inner side, which parts are spaced outwardly from the bowl 16 and are generally parallel to a tangent thereto. The frame also includes two spaced parallel connecting bars or elements 32 integral with the ends of the support bar and with the bowl 16 adjacent to its rim 22. In this embodiment of the invention, the frame 26 is completed by the integral rim portion of the bowl and an integral enlargement 34 of the rim portion between the connecting bars 32. The rim portion functions as a second support element and as a clamp base in the clasp 14, as will appear hereinafter. Two spaced parallel arches 35 are integral with the support bar 30, the connecting bars 32, and the bowl 16, and they provide additional support for the frame.

A jointed clamp element 36 is mounted on the frame in the opening 28 thereof. The clamp element is a strip-like member having two bent or arcuate rectangular inner and outer sections or arms 38 and 40, respectively. A normally upper side of the outer section 40 is provided with transverse ribs 41. The sections are joined together by an integral hinge web 42. The clamp element also includes a leg 44 coextensive with the width of the inner section 38 and having one end rigidly joined thereto intermediate the ends of the section integrally therewith. The structure provides a clamping arm 46 constituting the radially inner or free end of the inner section 38, which has one end rigidly joined to the leg and extends therefrom towards the container.

The other or inner end of the leg 44 is joined to the enlargement 34 on the bowl 16 by an integral hinge web 48. The outer end of the outer section 40 is joined to the enlargement 31 on the support bar 30 by an integral hinge web 50. Owing to the described construction, the clamp element 36 may be flexed between retracted and extended positions as illustrated in FIGS. 3 and 4, respectively, with the leg 44 pivoted over center on opposite sides of center in the respective positions, i.e., on opposite sides of a plane defined by the support elements 30 and 34. Thus, when pressure is exerted on the clamp element 36 in the normally upward direction of the arrow in FIG. 3, the element flexes and snaps into the position illustrated in FIG. 4. At this time, the leg 44 is over center on one side, and a stable position is achieved. When pressure is exerted on the clamp element in the normally downward reverse direction, the element flexes and snaps into the position illustrated in FIG. 3. At this time, the leg 44 is over center on the opposite side, and a stable position is achieved.

As noted above, the bowl rim 22 functions as a clamp base. A member may be clamped between the relatively movable clamping arm 46 of the clamp element 36 and th bowl rim. In the retracted position of the clamp element, shown in FIG. 3, the clamping arm is retracted from the bowl rim, and the clamp 14 is open. In the extended positions of the clamp element, shown in FIG. 4, the clamping arm is extended towards the bowl rim for clamping a member therebetween, and the clasp is closed.

The container cover 18 may be seated on the bowl 16, with their rims 24 and 22 abutting, or removed from the bowl when the clasps 14 are open. The cover, particularly its rim portion, is clamped between the clamping arms 46 and the bowl rim 22 when the clasps are closed. Each clasp is opened and closed readily by grasping the frame 26 between the fingers and pressing on the clamp element 36. Thus, finger pressure may be exerted on the normally upper side of the outer section 40 having the ribs 41 for this purpose, to open the clasp. Pressure may be exerted on the joint at the hinge web 42 for closing the clasp. The frame 26 of each clasp also serves as a handle for holding the container.

The bowl 16 and the clasps 14 are molded integrally in one piece of a synthetic organic plastic resin. Polypropylene plastic is the preferred material of construction, it having the property of permitting repeated flexure without breaking. However, other suitable material may be employed if desired. In manufacture, the clasps 14 are molded with their clamp elements 36 in the open position illustrated in FIG. 3. The cover 18 may be constructed by molding or other suitable means, of the same or any other suitable material.

The container and clasp assembly 60 illustrated in FIG. 7 includes a food container 62 and a pair of identical clasps 64, only one of which is shown. The container includes a circular cake platter or body 66 and a circular cover 68. The clasps are integrally mounted on the platter for security the cover thereon.

The platter 66 includes a recessed peripheral rim 70 thereabout. The cover 68 includes an enlarged circular rim 72 which seats on the platter rim. The enlargement provides inner and outer ledges or shoulders 74 and 76 around the rim portion of the cover. The container otherwise is constructed in a conventional manner for a cake platter and cover.

The clasp 64 is similar to the clasp 14 of the preceding embodiment, having certain elements in common which are identified by the same numbers. The clasp 64 includes a generally rectangular opening 80. The frame includes a support bar 30 having an enlargement 31 thereon, and two connecting bars 32. The connecting bars are integral with the ends of the suppore bar and with the rim portion of the platter 66, which completes the frame.

A jointed clamp element 36 is mounted on the frame in the opening 80 thereof. The clamp element 36 includes inner and outer sections 38 and 40 joined by an integral hinge web 42, ribs 41 on the outer section, and an integral leg 44 rigidly joined to the inner section 38 intermediate its ends. An integral clamping arm 46 is provided by the radially inner end of the inner section 38. The clamp element is integrally joined to the platter by a hinge web 48 joined to the other or inner end of the leg. The clamp element is integrally joined to the support bar 30 by a hinge web 50 joined to the enlargement 31 on the bar and to the outer end of the outer section 40.

The clamp element 36 in the assembly 60 may be flexed between the open and closed positions illustrated respectively in full and phantom lines in FIG. 7. In the open position, the clamping arm 46 is retracted from the platter 66 and its rim 70, so that the cover 68 may be mounted on or removed from the platter. In the closed position, the clamping arm is extended towards the platter and bears on the outer ledge 74 of the cover, thereby clamping the cover on the platter with the cover rim portion clamped between the clamping arm and the platter rim. The clamp element 36 may be manipulated in the same manner as in the preceding embodiment, and the frame 78 serves as a handle for holding the container.

The platter 66 and the clasps 64 preferably are molded integrally in one piece of plastic material such as polypropylene. The cover 68 may be molded or otherwise formed of the same or any other suitable material.

The clasp 82 illustrated in FIG. 8 is constructed for attachment to a container or other appropriate article for securing component parts thereof together and to serve as a handle. The clasp is similar to the preceding clasps 14 and 64, having certain elements in common which are identified by the same numbers. The clasp 82 includes a frame 84 constructed of a support bar 30, connecting bars 32, and a support strip or element 86 in spaced parallel relation to the support bar. A substantially rectangular opening 88 is provided in the frame. Arches 35 are integral with the support bar 30, the connecting bars 33, and the support strip 86. A clamp element 36 like the clamp element of the preceding embodiments is mounted in the frame opening 88 and integrally joined to the support bar and the support strip by hinge webs 48 and 50 in like manner to such embodiments.

The support strip 86 provides an attachment surface for joining the clasp 82 to a member such as a container body by adhesive, plastic welding, or other suitable means. A ledge 92 extends integrally from the top of the support strip where the leg 46 is joined thereto, and it is spaced from the clamping arm 46 therebelow. The ledge serves as a clamp base for clamping a member such as a container cover between the clamping arm and the base in the extended closed position of the clamp element 36. Alternatively, the ledge 92 might be omitted and the support strip 86 secured adjacent to a container rim, the rim then serving as the clamp base similarly to the structure of FIGS. 1-6. The clamp element is manipulated to open and close the clasp as in the preceding embodiments.

The clasp 82 preferably is molded integrally in one piece of plastic material such as polypropylene. The container or other member to which the clasp is secured may be constructed of any suitable material.

While certain preferred embodiments of the invention have been described and illustrated, it will be apparent that various changes and modifications may be made therein within the spirit and scope of the invention.

What is claimed is:

1. In combination with a container including separable body and cover container members, an over-center clasp comprising a support element spaced outwardly from one of said members, means rigidly connecting said support element to said said one member, a jointed clamp element including a plurality of sections joined together by hinge means, a leg having one end rigidly joined to the innermost one of said sections, and a clamping arm having one end rigidly joined to said leg, and hinge means joining the remaining end of said leg to said one member and the outermost one of said sections to said support element for flexing said clamp element between extended and retracted positions with at least portions of said sections pivoted over center on opposite sides of a plane defined by the leg hinge and the support element in the respective positions, the remaining end of said clamping arm engaging the remaining container member for clamping said container members together in the extended position of said clamp element.

2. The combination set forth in claim 1, wherein said clasp and said one member are molded integrally in one piece.

3. The combination set forth in claim 1, wherein said clasp and said one member are constructed integrally of polypropylene plastic.

4. In combination with a container including separable body and cover container members having abutting rims, a combined over-center clasp and handle comprising a frame including a support element spaced outwardly from said body member and two spaced connecting elements integral with said support element and said body member, a jointed clamp element in the space between said elements and body member including a plurality of sections joined together by a hinge web integral therewith between adjacent sections and a leg having one end rigidly joined to the innermost one of said sections intermediate its ends integrally therewith, hinge webs joining the remaining end of said leg to said body member adjacent its rim and the outermost one of said sections to said support element integrally therewith for flexing said clamp element between extended and retracted positions with at least portions of said sections pivoted over center on opposite sides of a plane defined by the leg hinge and the support element in the respective positions, the free end of said innermost section engaging said cover member for clamping its rim portion between said end and said body member rim in the extended position of said clamp element.

5. The combination set forth in claim 4, wherein said clasp and said handle and said body member are molded integrally in one piece.

6. The combination set forth in claim 4, wherein said clasp and said handle and said body member are constructed integrally and of polypropylene plastic.

References Cited

UNITED STATES PATENTS

| | | | |
|---|---|---|---|
| 736,053 | 8/1903 | Armstrong | 292—256.5 |
| 899,084 | 9/1908 | Thoits et al. | |
| 3,061,809 | 10/1962 | Morse | 339—14 |

JOSEPH R. LECLAIR, Primary Examiner

JAMES R. GARRETT, Assistant Examiner

U.S. Cl. X.R.

220—59